Figure 1:
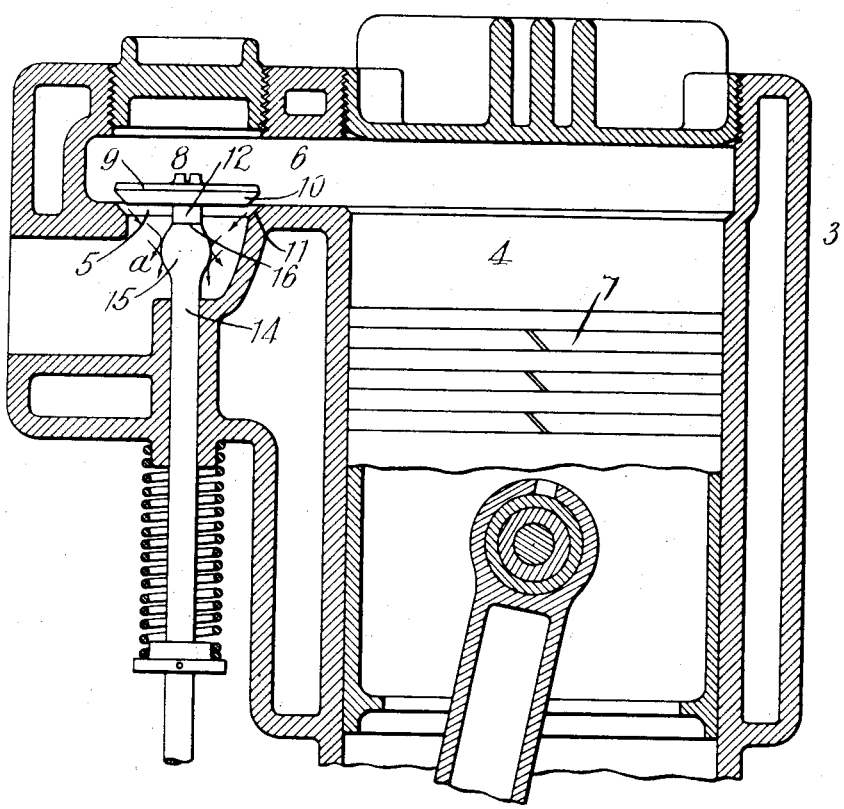

R. L. ELLERY.
VALVE.
APPLICATION FILED SEPT. 10, 1913.

1,141,870.

Patented June 1, 1915.

Witnesses.
Franklin E. Low.
Leonard A. Powell.

Inventor:
Robert L. Ellery.
by his attorney
Parker S. Gooding.

UNITED STATES PATENT OFFICE.

ROBERT L. ELLERY, OF TOLEDO, OHIO.

VALVE.         REISSUED 1,141,870.    Specification of Letters Patent.    Patented June 1, 1915.

Application filed September 10, 1913. Serial No. 789,028.

*To all whom it may concern:*

Be it known that I, ROBERT L. ELLERY, a citizen of the United States, residing at Toledo, in the county of Lucas and State of Ohio, have invented new and useful Improvements in Valves, of which the following is a specification.

This invention relates to improvements in valves, such for instance, as are used in connection with internal combustion engines and the like.

It has been common practice in the construction of the above type of valve to make the shanks, which must stand the wear due to the reciprocations of said valve of one kind of metal, such for instance, as carbon steel, while the heads of said valves which are exposed to intense heat from the engine cylinder, of metal which would be better adapted to withstand said heat, such as cast iron, nickel steel, etc., while the two members are welded together at a point adjacent said head. With the close proximity of said welding point to said head it has been exceedingly difficult with certain kinds of metal to produce a perfect weld and especially when the metal employed embraces exceptional heat radiating properties.

It has been found very desirable to use a steel, such as tungsten steel for the head, but this steel and carbon steel, which is employed in the shank of said valve, are exceptionally hard metals to weld requiring a very intense heat at the welding surfaces. The difficulty in welding is furthermore greatly increased where a large body of metal is present which is the case in the ordinary type of valve above mentioned.

The object of the invention is to provide a valve consisting of a head constructed of tungsten or high speed steel and a shank of carbon steel welded to said head, said head having a stem projecting from one face thereof for a short distance, to which said shank is connected a portion of said head adjacent said stem being recessed to substantially reduce the body of the metal constituting said head and thereby confine the heat applied to said stem within a smaller area, furthermore the opposite face of said head has a projection sufficiently large to contain the slot by means of which the valve is rotated, thus permitting the head to be made still thinner.

The object of the invention is further to provide a valve having an inclined circumferential face and a stem formed integral with said head by welding or otherwise having an annular enlargement surrounding the portion of said shank which aline with said inclined circumferential face, whereby the stem may more successfully resist the deteriorating effects of the hot gases which escape through the port opened by moving said valve and to deflect said gases downwardly away from said stem.

The invention consists in the combination and arrangement of parts whereby the above objects and certain other objects hereinafter appearing may be attained, as set forth in the following specification and particularly pointed out in the claims.

Figures 2, 3:
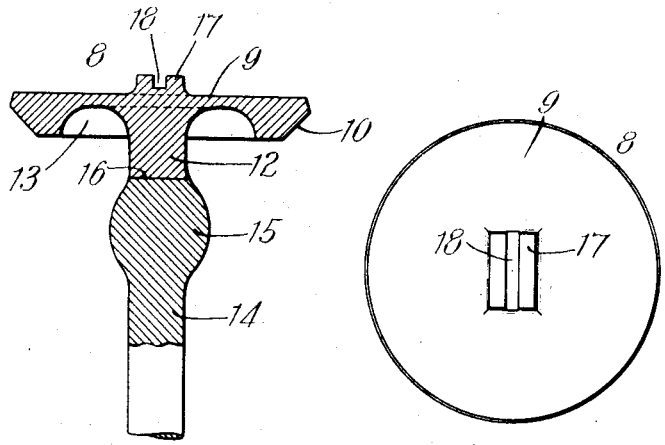

Referring to the drawings: Figure 1 is a detail sectional elevation of a portion of a gas engine with a valve embodying my invention shown in connection therewith. Fig. 2 is a detail section of said valve. Fig. 3 is a plan view of said valve.

Like numerals refer to like parts throughout the several views of the drawings.

In the drawings, 3 is an engine casing having a cylinder 4 and an exhaust port 5 connected by a passage 6 with said chamber 4, a piston 7 being arranged in said cylinder to operate in the usual manner well known to those skilled in the art. A valve 8, of the type commonly known in the art as a puppet valve, is arranged in said casing in suitable bearings and is adapted to be reciprocated to open and close said port, said valve consisting of a head or disk 9 provided with a circumferential face 10 which is inclined at an angle to the axis of said head and fits a complementary face 11 formed by countersinking said casing. A stem 12 is formed on said head, preferably integral therewith, with its median axial line substantially coinciding with the axis of said head, while surrounding said stem and formed within said head is a recess 13 which is for the purpose of reducing the volume of the metal surrounding said stem and comprising said head.

Heretofore it has been the custom in constructing valves of this nature to make the head of a thickness sufficient to permit the grinding of a screw-driver slot within said head upon the opposite face from which the stem projects, but in so doing the head is necessarily heavy and of such a volume that considerable heat will be radiated thereby. This difficulty has been overcome by providing a projection 17 upon the head sufficiently large to contain a screw-driver slot 18 but no larger. This permits the recess in the opposite side of said head to extend for a substantial distance therethrough, while the stem 12 may be made smaller in diameter and in this way the amount of metal contained in said head will be materially reduced, thus permitting a more intense heat to be maintained at the end 16 of the stem 12.

The stem 12 terminates at 16 substantially within the apex of a cone whose sides include said inclined circumferential face, said apex adapted to be intersected by the continuation of said median axial line of said stem. A shank 14 is welded to the end of the stem 12, said shank having an annular or bulbous enlargement 15 in the vicinity of or surrounding the portion of said shank which is intersected, or in alinement with the sides of the cone including the face 10, thus when said valve is moved to open the port, as indicated in Fig. 1, the hot gases from the cylinder 4 will be directed through said port and against said enlargement, which is of such a shape that as said gases contact with said enlargement they will be deflected, as indicated by the arrows "a," away from said shank. Thus said shank will be reinforced at a point where it is usually burnt away by the contact of said hot gases, while the force of said gases will be broken as they strike said enlargement owing to the refractive nature of its exterior surface. In forming the stem bulbously with its largest diameter located at the intersection of the cone, including the inclined face 10 of the valve, with said stem and gradually decreasing the diameter of said stem from said intersecting point there will be no shoulders or projections on said stem against which gases will directly impinge, thus substantially decreasing the deteriorating defects of said gases on said stem.

In the successful carrying out of the invention, as hereinbefore set forth, and particularly the welding of a tungsten steel head to a carbon steel stem, or at least a portion of the stem which has been referred to as the shank, an entirely new method of construction has become necessary and consists in providing a recess extending substantially through the head and surrounding the portion of said head to which the stem is to be welded, then hardening the head, then welding a shank of a different kind of material to the portion of said head which is surrounded by the recess hereinbefore mentioned and finally hardening the shank. This latter step of hardening the shank without changing the temper of the head is possible only when the head of the valve is constructed of tungsten steel as it permits the heating of the shank of the valve which has been welded to said head to a sufficient temperature to harden said shank without interfering with the temper of said hardened head, as one of the characteristics of tungsten steel is that it may be heated to a bright red sufficient to melt or soften ordinary steel without in the least softening said tungsten steel.

Having thus described my invention, what I claim and desire by Letters Patent to secure is:

1. A valve having, in combination, a head provided with an inclined circumferential face, a stem formed integral with said head, and an annular bulbous enlargement formed on said stem, the largest diameter of said enlargement being in the vicinity of the portion of said stem alining with said inclined face, said enlargement being gradually reduced from said largest diameter in both directions to the normal diameter of said stem.

2. A valve having, in combination, a head formed of tungsten steel and provided with a circumferential working face, a stem formed of the same material and integral with said head and surrounded by a recess formed within said head and extending substantially therethrough, and a shank of carbon steel welded to said stem.

3. A valve comprising a tungsten steel head provided with an inclined circumferential face, a stem formed integral with said head surrounded by a recess formed within and extending substantially through said head, and a carbon steel shank welded to said stem.

In testimony whereof I have hereunto set my hand in presence of two subscribing witnesses.

ROBERT L. ELLERY.

Witnesses:
CHARLES HARTMANN,
F. K. DENNY.